July 1, 1947.  S. C. HURLEY, JR  2,423,321
PHOTOELECTRICALLY CONTROLLED LIGHT POLARIZING ELEMENT
Filed July 29, 1944  2 Sheets-Sheet 1

INVENTOR.
SAMUEL C. HURLEY JR.
BY Benedict & Sunturood
ATTORNEYS

Patented July 1, 1947

2,423,321

UNITED STATES PATENT OFFICE 2,423,321

PHOTOELECTRICALLY CONTROLLED LIGHT POLARIZING ELEMENT

Samuel C. Hurley, Jr., Danville, Ill.

Application July 29, 1944, Serial No. 547,210

5 Claims. (Cl. 88—65)

Broadly, the invention comprises an apparatus for controlling the amount of light passing through a light-transmitting element from a light source to a point at which the light is received either by the human eye or a light sensitive device or some other object which is to be illuminated, and especially maintaining the illumination at or below a predetermined maximum.

More specifically, the invention relates to an apparatus for controlling the transmission of light which comprises at least two polarizing elements, at least one of which is adjustable so as to alter the amount of light transmittable through the polarizing unit, i. e., the combined polarizing elements, and a means for automatically regulating the amount of light thus transmitted to a predetermined value, said means being actuated by a photoelectric device. The photoelectric device may comprise a phototube or photocell and may be located at a point remote from the polarizing unit but must be in actuating communication therewith; or the photoelectric device may be located in such a manner as to receive the light transmitted through the polarizing elements. In other words the photoelectric device may receive light directly from the source or, alternatively, the light may first pass through the polarizing unit. These alternative devices are not necessarily equivalent.

It is an object of my invention to provide a device for regulating the amount of light transmitted, so as to reduce glare and the resultant discomfort, and, in some cases, danger attendant the exposure to intense light, particularly, the light which varies rapidly in intensity in a relatively short period of time.

A further object of the invention is to provide an apparatus whereby the polarizing axes of two simultaneously rotatable polarizing elements may be adjusted from a position in which the axes of transmission are parallel to a position in which they are substantially perpendicular. If desired, the two polarizing elements may be superimposed upon another fixed element.

My device does away with the need for manual adjustment of superimposed polarizing elements by making it automatic. A further and even greater advantage of my device lies in the fact that it can be used under conditions in which there is a marked and rapid variation of light intensity under conditions in which the manual control of the rotatable element would either be too slow to be effective or would be impractical from the standpoint that the person making the adjustment would have to stop whatever occupation he was engaged in to make the adjustment, thereby causing considerable inconvenience and annoyance, to the extent in some cases of destroying the utility of the device.

My invention will permit improved designs of welders' helmets. For example, they can be made dust and fume tight. Light, compact shields fitting the face and head of the operator comfortably can be used.

Other types of occupations in which similar conditions exist are around steel mills, foundries, blast furnaces, etc. The worker is subject to changing illuminating conditions of a very rapid order and the illumination changes quickly when he turns away from or toward the source of illumination. If he wears colored glasses or other type of shield, it cuts down the amount of light transmitted so that he may find himself, under certain conditions, to be unable to see as well as he should. On the other hand, if manually rotatable polarizing units are used, he is faced with the necessity for making an adjustment each time there is a change from the more intense to the less intense illumination or vice versa.

The illumination within the rooms of houses, offices, work shops, trains, etc., can be kept more nearly constant by one of several methods which may include attaching the device to the outside windows so as to regulate the amount of light transmitted. By simultaneously actuating and controlling the artificial illumination within a room, the amount of light reaching a given point in the room can be regulated to a reasonably constant value without need for manual adjustment other than to put the device into operation and to select the average light value desired.

Figure 1:
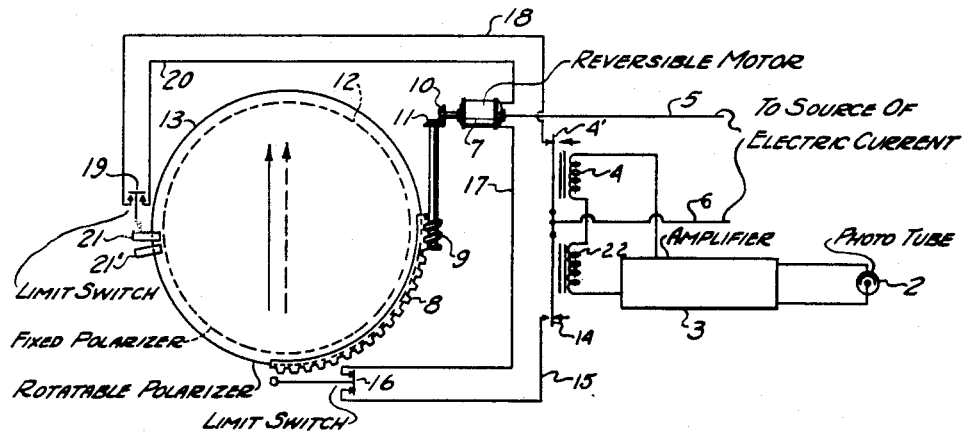
Figure 1 is a schematic drawing of a device illustrating the principle of my invention.

Reference is made to Figure 1 which illustrates one embodiment of my invention. The source of illumination 1 is shown as an incandescent bulb for purposes of illustration only. Light falls upon a photoelectric device which is illustrated as a phototube 2 responding thereto in proportion to the amount of light reaching it. The character and kind of phototube and photocells available are well-known and need not be described. Different tubes respond in a somewhat different manner to light, depending upon its wave length. A proper selection may be made for specific purposes and any satisfactory type of tube or cell may be used in this invention.

The position of the tube will depend upon the use to which the invention is put. For use with workmen's shields, it should be so positioned that it will receive light from the same source and of the same character as would strike the workmen's eyes. Thus it may preferably be placed on the helmet. In this way, the workman may turn his head and receive protection at all times since the cell will "see" the same light he sees.

In some cases, it is desirable to place a polarizing element over the phototube or to make the envelope of polarizing material, or place a window of polarizing material in the envelope; or the envelope may be coated with polarizing material. In general, the axis of transmission of such a polarizing mask or screen should be parallel to the fixed polarizing element in the unit. Thus the cell and the unit will respond only to light in a predetermined plane.

The current passed by phototube 2 is amplified in amplifier 3 which may be of conventional design and need not be described in detail. The source of power which is included may be a battery or any suitable source. When the device is to be carried by the user, as for example when it is used in connection with workmen's shields, it is an advantage to have the amplifier as compact and as lightly constructed as possible. It may be near or remote from the phototube and/or polarizing unit.

The current operates the switch of relays arranged as hereinafter described, so as to rotate a reversible motor which, in turn, rotates the polarizing element. Relay 4 which operates switch 4' is hooked in series with relay 22, which operates switch 14. A suitable source of power is supplied to leads 5 and 6. Lead 5, to reversible motor 7, is the common line of the motor. Lead 6 is attached to the line containing switches 4' and 14.

Switch 4' in line 18 connecting through limit switch 19 and line 20 to one side of the reversible motor 7 is normally closed so that motor 7 would be operating to rotate polarizing element 13 clockwise when limit switch 19 is closed. The contact is broken by stop 21 attached to polarizing element 13 thus turning off the motor when the element reaches a predetermined position. This is usually chosen as the point at which the transmission axes of the polarizing elements are paralleled.

As the light striking phototube 2 increases in intensity, the current passing to relay coil 4 is likewise increased, and eventually reaches a point at which relay 4 is actuated, pulling switch 4' into the open position. At this point, since limit switch 19 is open and since switch 4 is open, the motor cannot operate to turn the polarizing element in the clockwise direction; however, since limit switch 19 is open the motor can be operated in the reversible direction if switch 14 were closed.

Relay 22 is so chosen and constructed as to require a greater amount of current to actuate it than is required to actuate relay 4. In this manner, when the lighting conditions are exactly right, switch 4' will be held open and switch 14 which is normally open, will remain in the open position. As the intensity of light on phototube 2 increases, the current passing from the amplifier eventually reaches a point sufficient to energize relay 22, causing it to close switch 14, thereby completing the circuit through line 6, switch 14, line 15, limit switch 16, line 17, motor 7 and line 5. The motor will now operate to turn rotating polarizing element 13 in a counter-clockwise direction.

Phototube 2, which is preferably located behind the polarizing unit, receives less and less light as the polarizing axes of element 13 and element 12 become crossed to an increasing extent. Providing the light is not too strong, a point is eventually reached at which the current passed is insufficient to actuate relay 22 and as a consequence, switch 14 returns to its normal position thus cutting off the motor. Switch 4', however, remains open since sufficient current is being passed to energize relay 4.

If the light striking the phototube decreases still further to a point where switch 4' is no longer held open, it will close the circuit through line 18 and the motor will be reversed until enough light is received by the phototube to again energize relay 4 or until the two polarizing elements are at their maximum light transmitting point and limit switch 19 is caused to open.

If, however, the amount of light striking the phototube exceeds a certain predetermined value, the motor will continue to operate until stop 21' attached to rotating element 13 causes limit switch 16 to open. This may be the point of substantial cut off of light or at any desired intermediate point of rotation.

This device is merely one illustration of the manner in which my invention can be carried out. The invention is not intended to be limited to the exact method shown.

The limit switch stops 21 and 21' are adjustable by means not shown so that the total amount of rotation of the rotating polarizer may be adjusted as desired.

Numerous modifications of the polarizing unit of this apparatus may be used. The preferred modification embodies the use of at least one rotatable polarizing element and at least one other element which may be rotatable or may be fixed in relation to the first one. A further modification embodies two polarizing elements which may be in fixed relationship to each other and with a photoelastic element placed between the two polarizing units; thus the two polarizing elements may be placed with their transmission axes parallel. A device similar to that illustrated in Figure 1 may be used, except that a cam may be used in place of worm gear 9; or the gear 9 may operate a cam which is in contact with the photoelastic element so as to place a varying degree of pressure upon it.

The photoelastic elements have the property of causing plane polarized light to rotate when they are compressed or expanded; thus light passing the first polarizing element would be plane polarized, for example, in the horizontal plane and would strike the photoelastic member. Depending upon the amount of pressure being exerted upon the member, the plane in which the light vibrates will be rotated as much as 90°; thus the amount of light transmitted by the two polarizing elements can be regulated by increasing or decreasing the pressure on the photoelastic member. This is particularly useful modification in automobile windshields.

Figure 2:
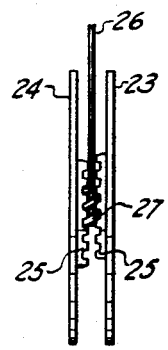
Figure 2 is a side elevation in simplified form of another modification of the polarizing element illustrated in Figure 1. In this case, both elements are rotatable.

Figure 2 is an illustration of the polarizing elements in which both elements are rotatable. The elements are indicated as 23 and 24. Each is equipped with a rack 25 and shaft 26 to a driving mechanism which operates worm gear 27. It will be observed that when the shaft is operating in one direction the two polarizing elements will rotate in opposite directions. The advantage of this type of device is that it is necessary to rotate the polarizing elements only half as much as when a single element must be rotated.

Figure 3:
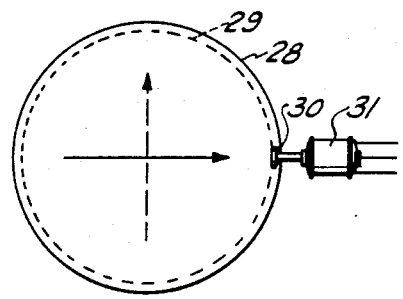
Figure 3 is a front view of a device in which one or both polarizing elements may be rotated in opposite directions by means of a rotatable friction wheel bearing upon the element or elements to be rotated.

Figure 3 illustrates two polarizing elements 28 and 29 which are superimposed. Element 28 is rotatable by wheel 30 bearing on the edge of the element 28 and operated by reversible motor 31. Element 29 is fixed.

Figure 4:
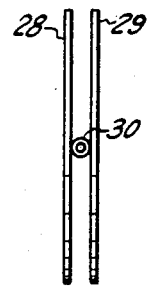
Figure 4 is a side view of the device shown in Figure 3 as applied to two oppositely rotatable polarizing elements superimposed.

Figure 4 is a side view of this device adapted with wheel 30 bearing on both elements. In this case, elements 28 and 29 are both rotatable, in opposite directions. In another embodiment wheel 30 might be a gear and the edge of the polarizers might be geared to engage the gear 30 to effect rotation of the elements.

Figure 5:
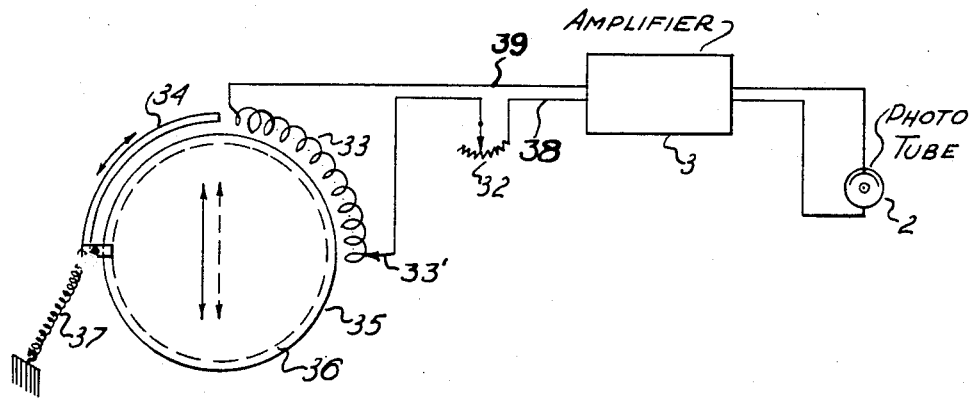
Figure 5 is a schematic illustration of another embodiment of my invention.

Referring to Figure 5, which is a schematic representation of another embodiment of my invention, tube 2 is connected to amplifier 3. A variable rheostat 32 is placed in the circuit from the amplifier to permit manual setting of the point at which rotation of the polarizers is accomplished.

By means of variable contactor 33', the armature 34 can be made to "bottom" at different points in the solenoid 33 which acts with the armature 34 to rotate polarizing element 35, the latter being superimposed on the fixed polarizing element 36. The spring 37 pulls against the pull of the electromagnet to return the polarizing element to the normal position when the tube is not lighted. Such a device is suitable where the illumination varies between some low value and a more or less definite high value which is always about the same.

These devices are given for purposes of illustration and are not intended to limit the invention unduly.

Figure 6:
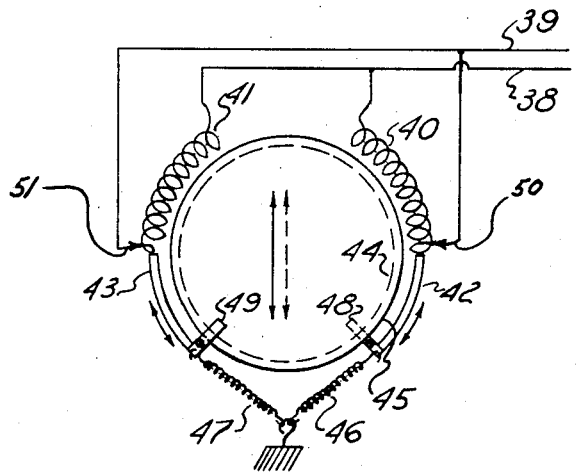
Figure 6 is another illustration of my invention.

Figure 6 illustrates another embodiment of my invention wherein the polarizing elements are rotatable in opposite directions. The leads 38 and 39 may be connected with the photoelectric circuit as illustrated, for example, in Figure 5. They are attached to solenoids 40 and 41 which act on the armatures 42 and 43 attached respectively to rotatable polarizing elements 44 and 45. The springs 46 and 47 are attached to and pull against the armatures, being attached as are the armatures to the respective polarizing elements by brackets 48 and 49. The springs may be attached to a fixed structure by any suitable means.

The unit may operate as follows: When sufficient light strikes the phototube or cell, a current passes through the solenoids 40 and 41 pulling the armatures 42 and 43 in a direction opposite to the pull of the springs 46 and 47, thereby rotating polarizers 44 and 45 in opposite directions. The amount of rotation will depend largely on where the solenoid is "bottomed," which may be adjusted by variable contactors 50 and 51 on solenoids 40 and 41. By rotating the polarizers, the amount of light passing the polarizers can be kept controlled automatically.

I claim as my invention:
1. An apparatus of the class described for automatically maintaining within predetermined limits the amount of light transmittable through a light transmission means receiving light from a source or sources varying in intensity in which said light transmission means comprises a pair of superimposed and adjacent light polarizing elements with polarizing axes mounted in substantial parallel alignment with at least one of said elements being mounted for relative rotation through an angle of about 90° with respect to the other element, said apparatus further comprising a photoelectric device positioned to receive light passing through said light transmission means, power operated means engaging the polarizing elements mounted for rotation for rotating it, said power operated means being operatively controllable by said photoelectric device so as to rotate said rotatable polarizing element relative to the other from substantially parallel alignment of the polarization axes through an angle of 90°, said rotation being in the direction of parallel alignment of the polarization axes when receiving light of decreasing intensities and in the direction away from parallel alignment of the polarization axes when receiving light of increasing intensities to maintain within predetermined limits the amount of light transmitted through said light transmission means independent of the intensity of light received by said light transmission means.

2. The apparatus of claim 1 further defined by both of said polarizing elements being rotatable relative to each other through an angle of about 90° by said power operated means engaging each of said polarizing elements.

3. The apparatus of claim 1 further characterized by said power operated means comprising a reversible motor, an electric circuit for said motor comprising relays, an amplifier and said photoelectric device whereby to actuate said reversible motor, the direction of rotation thereof depending upon the amount of light received by said photoelectric device.

4. The apparatus of claim 1 further characterized by said power operated means comprising a reversible motor, and limit switches to limit the maximum possible rotation of said polarizing elements.

5. The apparatus of claim 1 further characterized by said power operated means comprising a reversible motor, limit switches to limit the maximum possible rotation of said polarizing elements, an amplifier for amplifying the output of said photoelectric device, relays in a circuit with said amplifier whereby to actuate said motor the direction and extent of the operation of the motor being within allowable limits depending upon the amount of light received by said photoelectric device, said relays comprising a pair of relay coils connected in series to said amplifier, a pair of relay switches operatively controlled by said relay coils, one of said relay switches being closed when the axis of the two polarizing elements are in substantial alignment and the other of said relay switches being opened, the relay coil associated with the closed switch requiring less current to operate the switch than the relay for actuating the open switch, said relative values of the relay coils being such that when the predetermined amount of light is being transmitted through the light transmission means both of said switches are opened, said first mentioned switch controlling the reversible motor to rotate the polarizing elements in a direction away from parallel alignment and said second switch adapted and arranged upon closing to cause the reversible motor to rotate the polarizing elements in a direction toward parallel alignment.

SAMUEL C. HURLEY, Jr.

REFERENCES CITED

The following references are of record in the file of this patent:

UNITED STATES PATENTS

| Number | Name | Date |
|---|---|---|
| 2,311,840 | Land | Feb. 23, 1943 |
| 2,362,832 | Land | Nov. 14, 1944 |
| 2,302,554 | Kingsbury | Nov. 17, 1942 |
| 2,244,362 | Hartig | June 3, 1941 |
| 2,206,575 | Pineo | July 2, 1940 |
| 1,291,636 | Brodsky | Jan. 14, 1919 |
| 2,064,812 | Bouchard | Dec. 22, 1936 |
| 947,490 | Gwozda | Jan. 25, 1910 |
| 2,030,854 | Calver | Feb. 18, 1936 |
| 696,017 | Dutton | Mar. 25, 1902 |
| 2,307,479 | Annick | Jan. 5, 1943 |
| 1,854,892 | Ewend | Apr. 19, 1932 |
| 2,029,170 | Hull | Jan. 28, 1936 |
| 2,183,217 | Goldsmith | Dec. 12, 1939 |
| 2,230,262 | Pollack | Feb. 4, 1941 |
| 1,934,484 | Camilli | Nov. 7, 1933 |
| 2,376,493 | Land et al. | May 22, 1945 |
| 2,167,484 | Berry | July 25, 1939 |
| 2,346,794 | Seeger et al. | Apr. 18, 1944 |

FOREIGN PATENTS

| Number | Country | Date |
|---|---|---|
| 313,770 | Germany | July 19, 1919 |
| 763,279 | France | Feb. 12, 1934 |